United States Patent
Yang

(10) Patent No.: US 11,036,945 B2
(45) Date of Patent: Jun. 15, 2021

(54) SYSTEM FOR GENERATING AND VERIFYING A MATRIX BARCODE, METHOD FOR GENERATING A MATRIX BARCODE, AND METHOD FOR VERIFYING A MATRIX BARCODE

(71) Applicant: Chien-Kang Yang, Taipei (TW)

(72) Inventor: Chien-Kang Yang, Taipei (TW)

( * ) Notice: Subject to any disclaimer, the term of this patent is extended or adjusted under 35 U.S.C. 154(b) by 0 days.

(21) Appl. No.: 16/879,055

(22) Filed: May 20, 2020

(65) Prior Publication Data

US 2020/0380223 A1    Dec. 3, 2020

(30) Foreign Application Priority Data

May 28, 2019 (TW) ................... 108118426

(51) Int. Cl.
*G06K 7/14*     (2006.01)
*G06K 19/06*    (2006.01)
*G06K 7/10*     (2006.01)

(52) U.S. Cl.
CPC ....... *G06K 7/10722* (2013.01); *G06K 7/1417* (2013.01); *G06K 19/06037* (2013.01)

(58) Field of Classification Search
None
See application file for complete search history.

(56) References Cited

U.S. PATENT DOCUMENTS

| 9,704,081 B2* | 7/2017 | Tanaka ..................... G06K 1/12 |
| 2013/0026241 A1* | 1/2013 | Sakahashi ........ G06K 19/06056 235/494 |
| 2017/0147914 A1 | 5/2017 | Wang | |

FOREIGN PATENT DOCUMENTS

| CN | 105701528 A | 6/2016 |
| CN | 105740931 A | 7/2016 |
| TW | M544091 U | 6/2017 |
| WO | 2019011129 A1 | 1/2019 |

OTHER PUBLICATIONS

Search Report appended to an Office Action, which was issued to Taiwanese counterpart application No. 108118426 by the TIPO dated Jul. 3, 2020, with an English translation thereof.
Search Report issued to European counterpart application No. 20176626.8 by the EPO dated Nov. 9, 2020.
Search Report appended to an Office Action issued to Taiwanese counterpart application No. 108118426 by the TIPO dated Mar. 4, 2020.

* cited by examiner

*Primary Examiner* — Kristy A Haupt
(74) *Attorney, Agent, or Firm* — MLO, a professional corp.

(57) ABSTRACT

A system for generating and verifying a matrix barcode includes a generating device for generating a matrix barcode by encoding a target data set and a verification data set, and a verifying device. The matrix barcode has a verification zone presenting verification information that is related to the verification data set. The verifying device decodes the matrix barcode to obtain the target data set and the verification data set, obtains the verification information from the verification zone in the matrix barcode, and determines whether the verification information obtained from the verification zone is related to the verification data set obtained by decoding the matrix barcode.

14 Claims, 15 Drawing Sheets

| ordinal number | verification data |
|---|---|
| 4th | A |
| 3rd | B |
| 2nd | C |
| 1st | D |

FIG. 16

SYSTEM FOR GENERATING AND VERIFYING A MATRIX BARCODE, METHOD FOR GENERATING A MATRIX BARCODE, AND METHOD FOR VERIFYING A MATRIX BARCODE

CROSS-REFERENCE TO RELATED APPLICATION

This application claims priority of Taiwanese Patent Application No. 108118426, filed on May 28, 2019.

FIELD

The disclosure relates to a system for generating and verifying a barcode, and more particularly to a system for generating and verifying a matrix barcode having a verification zone that presents verification information.

BACKGROUND

A conventional matrix barcode (including a quick response (QR) code, a Data Matrix, etc.) is generated according to international standards (e.g., ISO/IEC 18004 and ISO/IEC 16022). The international standards for generating the conventional matrix barcode and the barcode verifier standards are focused on the quality of barcodes, and not on verification of the barcodes.

Conventionally, to make sure that a conventional matrix barcode is real, not fake or having been tampered with, a barcode decoder (e.g., a barcode reader) used for decoding the conventional matrix barcode should be connected to an external verification institution and would transmit data contained by the conventional matrix barcode to the external verification institution for verification thereby.

SUMMARY

One object of the disclosure is to provide a system for generating and verifying a matrix barcode.

According to one aspect of the disclosure, the system includes a barcode generating device and a barcode verifying device. The barcode generating device includes a storage configured to store a target data set and a verification data set, a first output unit, and a first processor electrically connected to the storage and the first output unit. The first processor is configured to generate a matrix barcode by encoding the target data set and the verification data set, and to control the first output unit to display the matrix barcode. The matrix barcode has a verification zone presenting a piece of verification information. The piece of verification information is related to the verification data set.

The barcode verifying device includes an image capturing unit that is configured to capture an image of the matrix barcode, a second processor electrically connected to the image capturing unit for receiving the image of the matrix barcode therefrom, and a second output unit electrically connected to the second processor. The second processor is configured to: decode the matrix barcode in the image to obtain the target data set and the verification data set; obtain the piece of verification information presented in the verification zone in the image of the matrix barcode; and determine whether the piece of verification information presented in the verification zone is related to the verification data set obtained by decoding the matrix barcode in the image. The second output unit is controlled by the second processor to output a result of verification of the matrix barcode.

Another object of the disclosure is to provide a method for generating a matrix barcode.

According to the disclosure, the method is implemented by the barcode generating device, and includes:

storing, by the storage, a target data set and a verification data set;

generating, by the first processor, a matrix barcode by encoding the target data set and the verification data set, the matrix barcode having a verification zone that presents a piece of verification information which is related to the verification data set; and controlling, by the first processor, the output unit to display the matrix barcode.

Further another object of the disclosure is to provide a method for verifying a matrix barcode.

According to the disclosure, the method is implemented by the barcode verifying device. The matrix barcode is generated by encoding the target data set and the verification data set, and has a verification zone presenting a piece of verification information that is related to the verification data set.

The method includes:

capturing, by the image capturing unit, an image of the matrix barcode;

decoding, by the second processor, the matrix barcode in the image to obtain the target data set and the verification data set;

obtaining, by the second processor, the piece of verification information presented in the verification zone in the image of the matrix barcode; and determining, by the second processor, whether the piece of verification information presented in the verification zone is related to the verification data set obtained by decoding the matrix barcode in the image.

BRIEF DESCRIPTION OF THE DRAWINGS

Other features and advantages of the disclosure will become apparent in the following detailed description of the embodiments with reference to the accompanying drawings, of which:

FIG. 16 illustrates a plurality of verification data sets, each including a piece of verification data and an ordinal number;

DETAILED DESCRIPTION

Figure 1:
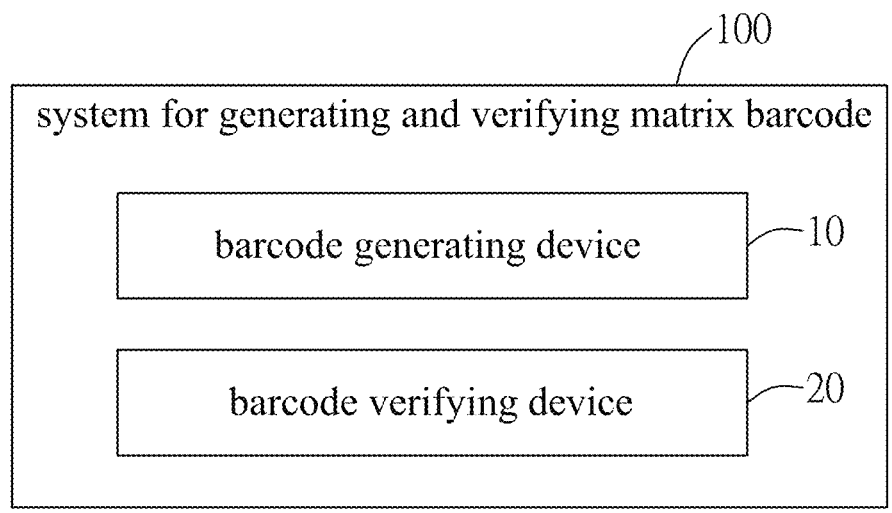
FIG. 1 is a block diagram illustrating a system for generating and verifying a matrix barcode according to one embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, an embodiment of a system 100 for generating and verifying a matrix barcode (i.e., a two-dimensional barcode) according to the disclosure includes a barcode generating device 10 and a barcode verifying device 20.

Figure 2:
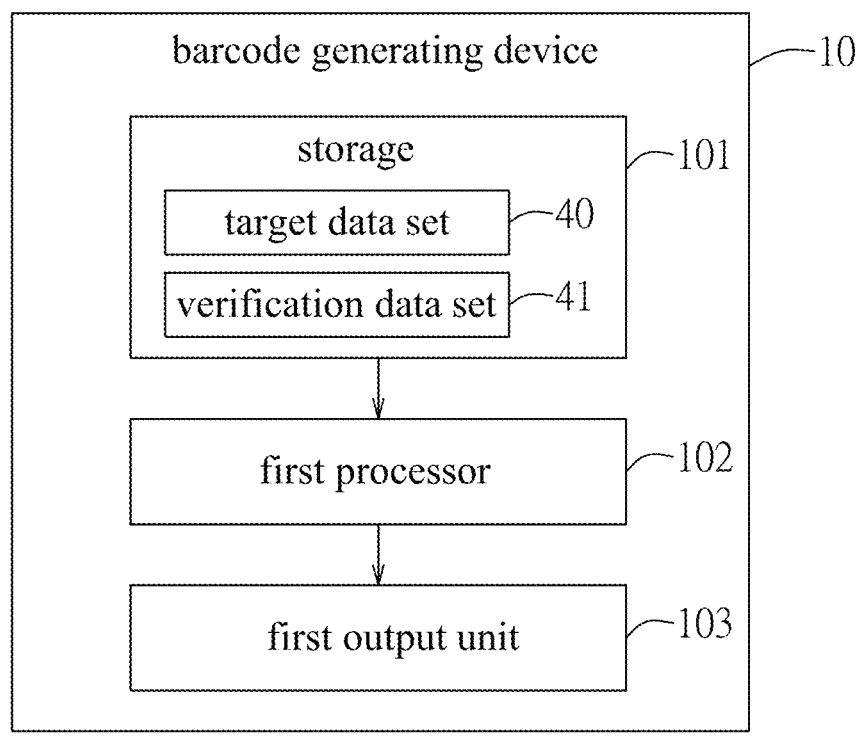
FIG. 2 is a block diagram illustrating a barcode generating device according to one embodiment of the disclosure.

Referring to FIG. 2, the barcode generating device 10 is configured to implement a method for generating a matrix barcode, and includes a storage 101, a first output unit 103, and a first processor 102 electrically connected to the storage 101 and the first output unit 103. The barcode generating device 10 may be any electronic computing device, such as, but not limited to, a personal computer, a notebook computer, a tablet, a smartphone, a smartwatch, etc. In other embodiments, the barcode generating device 10 may be a cloud-based platform, or an electronic device that is electrically connected to a hardware carrier. The hardware carrier may be a smart card or a chip which is configured to generate a matrix barcode according to an embodiment of this disclosure, and functions as the first processor 102.

Figure 3:
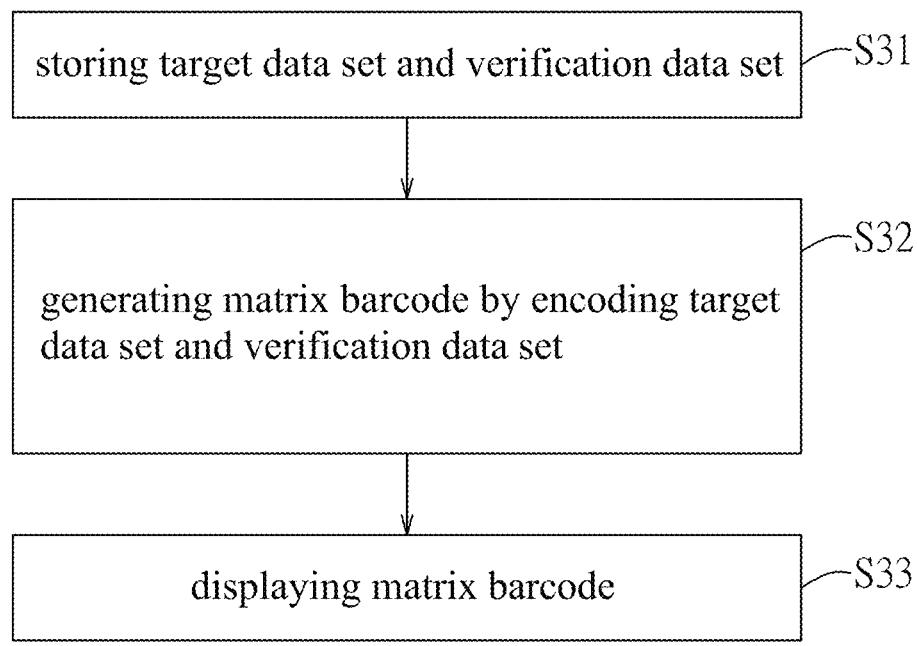
FIG. 3 is a flow chart illustrating steps of a method for generating a matrix barcode according to one embodiment of the disclosure.

Further referring to FIG. 3, the method for generating a matrix barcode includes the following steps. In step S31, the storage 101 of the barcode generating device 10 stores a target data set 40 and a verification data set 41. The verification data set 41 may be in the form of a picture, an audio signal, a character, a number or a combination thereof. It should be noted that "a data set" may include one or more pieces of data, and "a combination of a picture, an audio signal, a character and a number" may include one or more pictures, one or more audio signals, one or more characters, or one or more numbers.

Figure 4:
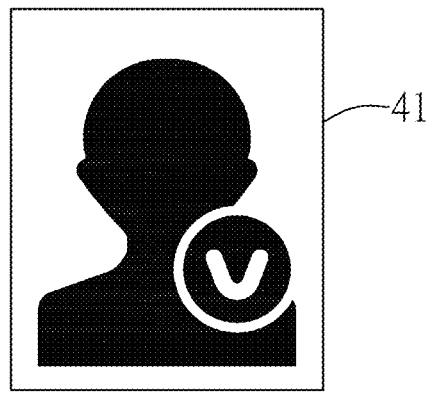
FIG. 4 illustrates a verification data set in the form of a picture.

In this embodiment, as shown in FIG. 4, the verification data set 41 is in the form of a picture. The target data set 40 and the verification data set 41 may, but not limited to, both be provided by a single third-party device or provided respectively by two different third-party devices. Alternatively, the target data set 40 may be provided by a third-party device while the verification data set 41 is generated by the first processor 102 based on or independent of the target data set 40. It should be noted that the target data set 40 is the data to be provided via a matrix barcode, and the verification data set 41 is the data used to verify whether the matrix barcode has been tampered with.

In step S32, the first processor 102 accesses the target data set 40 and the verification data set 41 in the storage 101, and generates a matrix barcode 5 (see FIG. 5) by encoding the target data set 40 and the verification data set 41 in the matrix barcode 5 according to a specific encoding standard, e.g., one or more encoding standards for encoding data in a QR code. The matrix barcode 5 has a data zone 50 and a verification zone 51. The data zone 50 presents a data barcode 501 which has the target data set 40 and the verification data set 41 encoded therein. Specifically, the target data set 40 and the verification data set 41 are both encoded into a single data set, which is then encoded in the data barcode 501. In this embodiment, the verification zone 51 is embedded in or lays over the data zone 50, and presents a piece of verification information 511 which is generated based on the verification data set 41 by the first processor 102. The verification information 511 may be presented in the form of a picture, a character, a number, a barcode or a combination thereof. In this embodiment, the verification information 511 is presented in the form of a picture displayed in the verification zone 51.

In other embodiments, to enhance security of information, the first processor 102, in step S32, may further encrypt the target data set 40 and the verification data set 41. Specifically, the first processor 102 may first encrypt the target data set 40 and the verification data set 41 according to an encryption algorithm with an encryption key to generate an encrypted data set, and then encode the encrypted data set to generate the data barcode 501, which contains the encrypted data set.

Figure 6:
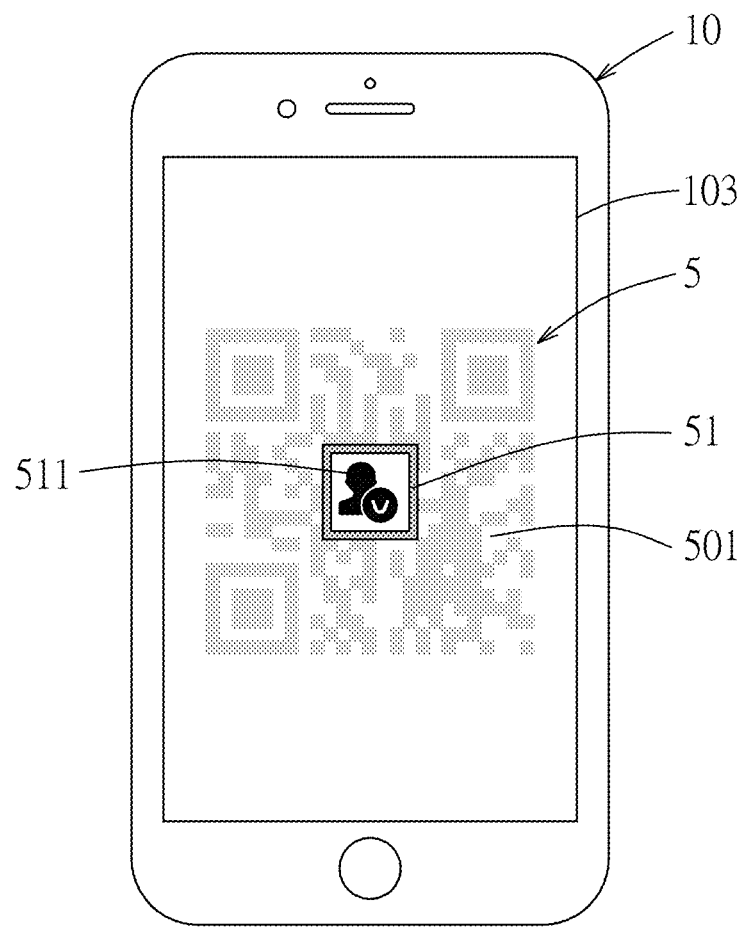
FIG. 6 illustrates a barcode generating device displaying a matrix barcode.

In step S33, the first processor 102 then controls the first output unit 103, e.g., a display screen, to display the matrix barcode 5, as shown in FIG. 6.

Further, the first processor 102 may transmit the matrix barcode 5 back to the third-party device that provided the target data set 40, for the third-party device to use the matrix barcode 5 for various purposes. For example, the matrix barcode 5 may be used as an electronic ticket, may be used for providing an advertisement, may be attached to a commodity or an article, or may be used in online transaction (e.g., online shopping) or stock transaction.

Figure 7:
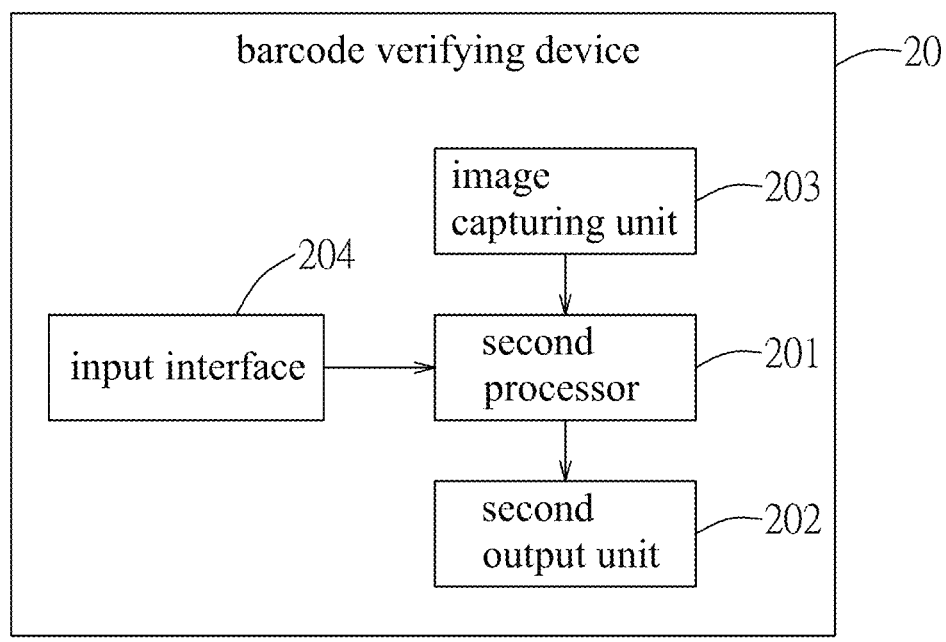
FIG. 7 is a block diagram illustrating a barcode verifying device according to one embodiment of the disclosure.

Referring to FIG. 7, the barcode verifying device 20 is configured to implement a method for verifying a matrix barcode that is generated according to an embodiment of this disclosure. The barcode verifying device 20 includes an image capturing unit 203 (e.g., a camera or a reader), a second output unit 202 (e.g., a display screen), and a second processor 201 electrically connected to the image capturing unit 203 and the second output unit 202. The barcode verifying device 20 may be any electronic device that can capture a barcode, such as, but not limited to, a barcode reader, a smartphone, a tablet, etc.

Figure 5:
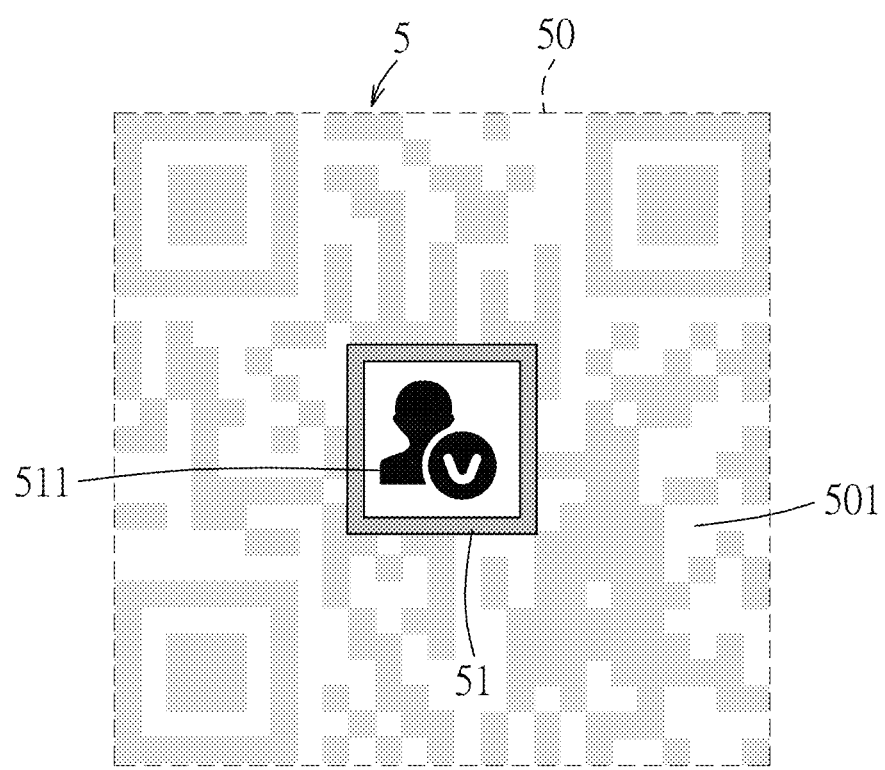
FIG. 5 illustrates a matrix barcode generated by the barcode generating device according to one embodiment of the disclosure.
Figure 8:
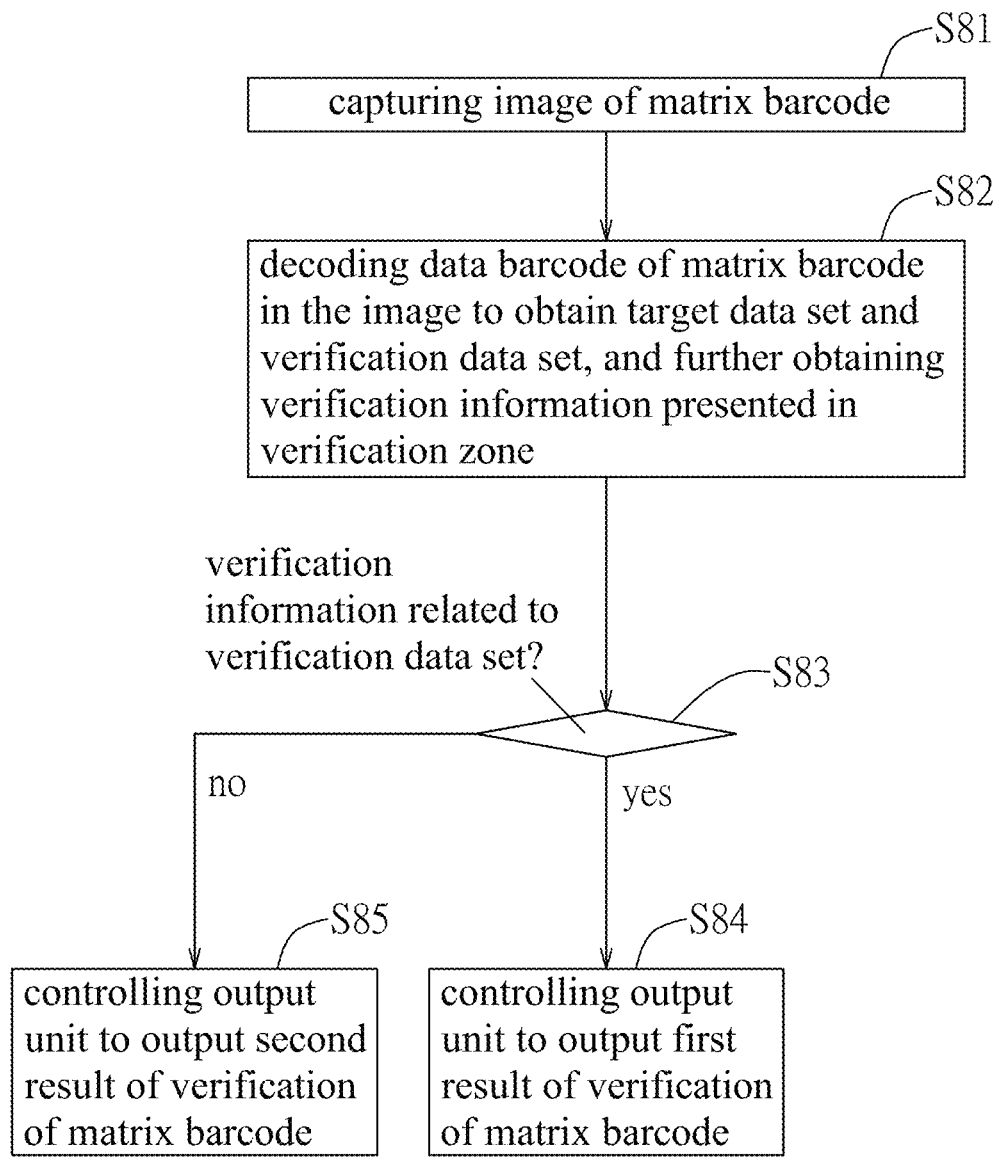
FIG. 8 is a flow chart illustrating steps of a method for verifying a matrix barcode according to one embodiment of the disclosure.

Further referring to FIG. 8, the method for verifying a matrix barcode includes the following steps. In step S81, the image capturing unit 203 of the barcode verifying device 20 captures an image of a matrix barcode (e.g., the matrix barcode 5 generated by the barcode generating device 10, as shown in FIG. 5). The second processor 201 receives the image of the matrix barcode 5 from the image capturing unit 203.

In step S82, the second processor 201 decodes the data barcode 501 of the matrix barcode 5 in the image to obtain the target data set 40 and the verification data set 41, and further to obtain the verification information 511 presented in the verification zone 51. In some embodiments, the second processor 201 obtains the verification information 511 from a part of the image of the matrix barcode 5 at a default location where the first processor 102 is configured to embed the verification zone 51 in the matrix barcode 5.

In the case that the first processor 102 encrypts the target data set 40 and the verification data set 41 to generate the encrypted data set and encodes the encrypted data set to generate the data barcode 501 containing the encrypted data set, the second processor 201 would decode the data barcode 501 to obtain the encrypted data set, and then decrypt the encrypted data set with a decryption key that corresponds to the encryption key to obtain the target data set 40 and the verification data set 41.

In step S83, the second processor 201 determines whether the verification information 511 presented in the verification zone 51 is related to the verification data set 41 obtained by decoding the data barcode 501. For example, in this embodiment, both the verification data set 41 and the verification information 511 are pictures, and the second processor 201 implements the determination of step S83 by comparing the pictures of the verification data set 41 and the verification information 511. The technology of comparing two images is well-known in the art, and may include steps of collecting features from each image, quantifying the features to obtain a value for each image, and comparing the values obtained respectively from the two images. In the case that the difference between the values is small (e.g., less than a preset value), it would be determined that the two pictures are the same (or match each other) and so the verification information 511 is related to the verification data set 41; in the case that the difference between the values is large (e.g., greater than the preset value), it would be determined that the two pictures are not the same (or do not match each other), and so the verification information 511 is not related to the verification data set 41. It is noted that, in other embodiments, the second processor 201 determines whether the verification information 511 is related to the verification data set 41 by comparing characters, numbers, templates, and/or descriptors in the verification information 511 and the verification data set 41 (e.g., using RootSift, SURF), which will be elaborated with examples in the following paragraphs.

The process goes to step S84 when the determination made in step S83 is affirmative (i.e., the verification information 511 is related to the verification data set 41), and the process goes to step S85 when otherwise.

Figure 9:
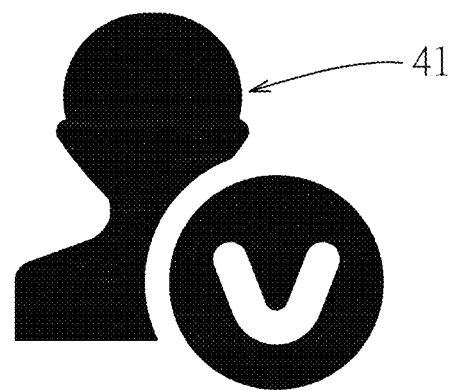
FIG. 9 illustrates a first result of verification of the matrix barcode.

In step S84, the second processor 201 controls the second output unit 202 to output a first result of verification of the matrix barcode 5 by displaying, for example, "verified" as shown in FIG. 9. Furthermore, the second processor 201 may control the second output unit 202 to display the first result of verification of the matrix barcode 5 together with the verification data set 41 that was obtained in step S82, so that a user may determine whether the verification information 511 shown on the matrix barcode 5 is related to the verification data set 41 himself/herself.

In step S85, the second processor 201 controls the second output unit 202 to output a second result of verification of the matrix barcode 5 by displaying, for example, "verification failed".

In this way, the user would be aware if the matrix barcode 5 has been tampered with or not. Further, only in the case that the matrix barcode 5 is verified will the second processor 201 control the second output unit 202 to output the target data set 40 obtained from the data barcode 501.

In another embodiment, the verification data set 41 is in the form of an audio signal, while the verification information 511 is presented in the form of a picture that has an image related to the content of the audio signal, or a character-number set (containing character(s) and/or number(s)) that corresponds to the content of the audio signal. For example, the audio signal of the verification data set 41 is pronunciation of certain character(s) and/or number(s). The first processor 102 converts the audio signal into the certain character(s) and/or number(s), which serve as the verification information 511, using algorithms such as convolutional neural network (CNN), connectionist temporal classification (CTC), recurrent neural network (RNN) (e.g., long short-term memory (LSTM) network), etc.

The second processor 201 decodes the data barcode 501 of the matrix barcode 5 in the image, obtains the verification data set 41, and may further control a speaker (not shown) to output the audio signal in step S82. In step S83, the second processor 201 performs audio analysis on the audio signal obtained in step S82 to obtain features of the audio signal (i.e., the verification data set 41). The second processor 201 also analyzes the content of the verification information 511 (e.g., the picture, or the character-number set) to obtain features from the content of the verification information 511. Then, the second processor 201 compares the features of the verification data set 41 with the features of the verification information 511 to determine whether the verification information 511 is related to the verification data set 41.

In a similar embodiment, after the speaker outputs the audio signal, the user may compare the audio signal (verification data set 41) outputted by the speaker with the verification information 511 shown in the verification zone 51 of the matrix barcode 5 himself/herself. That is to say, in this case, steps S83 to S85 could be omitted.

In another embodiment, the verification data set 41 is still in the form of an audio signal, while the verification information 511 is presented in the form of a character-number set. In step S82, rather than outputting the audio signal, the second processor 201 converts the audio signal into a set of character(s) and/or number(s) using to algorithms such as CNN, CTC, RNN, etc., to conform with the form of the verification information 511. Then, in step S83, the second processor 201 compares the character(s) and/or number(s) obtained from the audio signal in step S82 to the character-number set of the verification information 511, so as to determine whether the verification information 511 is related to the verification data set 41. In a similar embodiment, instead of being presented in the form of a character-number set, the verification information 511 is presented in the form of a picture. In step S82, the second processor 201 would convert not only the audio signal (the verification data set 41), but also the picture (the verification information 511) into character(s) and/or number(s), for comparison in S83.

In other embodiments, the barcode verifying device 20 further includes an input interface 204 (as shown in FIG. 7), e.g., a microphone. In step S82, rather than obtaining the verification information 511 from the verification zone 51 in the image, the second processor 201 receives a user input (e.g., an audio input) from the user via the input interface 204, and makes the user input serve as the verification information 511. In such case, when the user sees the verification information 511 in the verification zone 51, he/she should read out the content of the verification information 511, then the second processor 201 receives and processes the audio input to determine whether the audio input (the verification information 511) is related to the verification data set 41.

Figure 10:
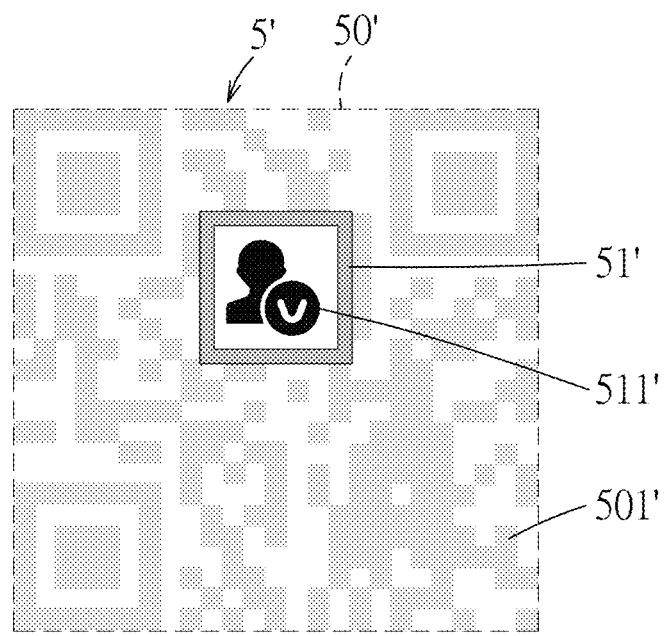
FIGS. 10 and 11 each illustrate a matrix barcode having a verification zone at a location that is determined based on location data.
Figure 11:
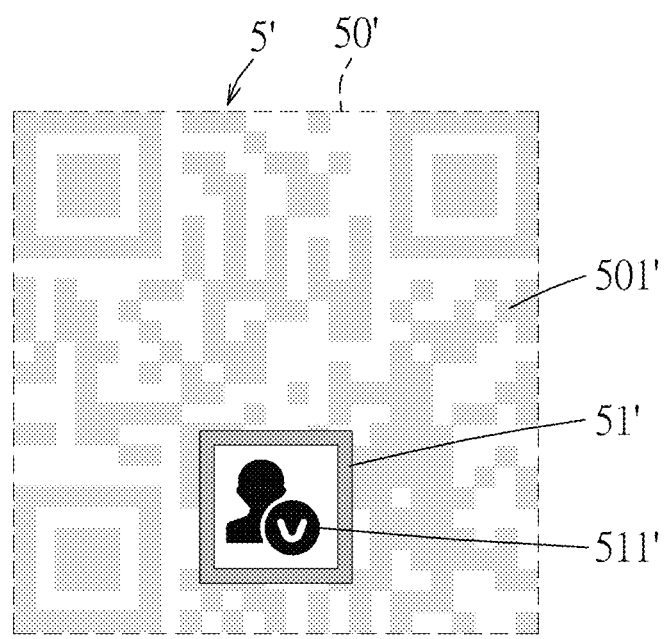

In other embodiments, the verification data set 41 includes a piece of location data (e.g., a set of coordinates)

and a piece of verification data. The verification data may be presented in the form of a picture, an audio signal, a character, a number or a combination thereof. In this embodiment, the verification data is presented in the form of a picture. Referring to FIG. 10, the first processor 102 determines a location of a verification zone 51' in a matrix barcode 5' based on the location data of the verification data set 41, and generates the verification information 511' based on the verification data of the verification data set 41. Further, the location data may be generated dynamically with reference to the time right before the method for generating a matrix barcode is to be initiated, or with reference to the verification data of the verification data set 41, but this disclosure is not limited in this aspect. Thus, the verification zone 51' would be at different locations in the matrix barcode 5' when the matrix barcode 5' is generated at different times or when the content of the verification data is changed (see FIG. 11).

In this embodiment, after the image capturing unit 203 of the barcode verifying device 20 captures the image of the matrix barcode 5' (S81), the second processor 201 decodes the data barcode 501' in the image to obtain the verification data set 41 (S82). The second processor 201 further obtains the verification information 511' from the verification zone 51' of the matrix barcode 5' according to the location data of the verification data set 41 thus obtained (S82), and then determines whether the verification information 511' is related to the verification data of the verification data set 41 (S83). Since the location of the verification zone 51' in the matrix barcode 5' is made to correspond to the location data of the verification data set 41, in the case that the matrix barcode 5' has been tampered with, the correspondence between the location data of the verification data set 41 and the location of the verification zone 51' would be disrupted, and the second processor 201 would not be able to find the verification zone 51'. Accordingly, it can be determined that the matrix barcode 5' has been tampered with when the second processor 201 cannot find the verification zone 51'.

Figure 12:
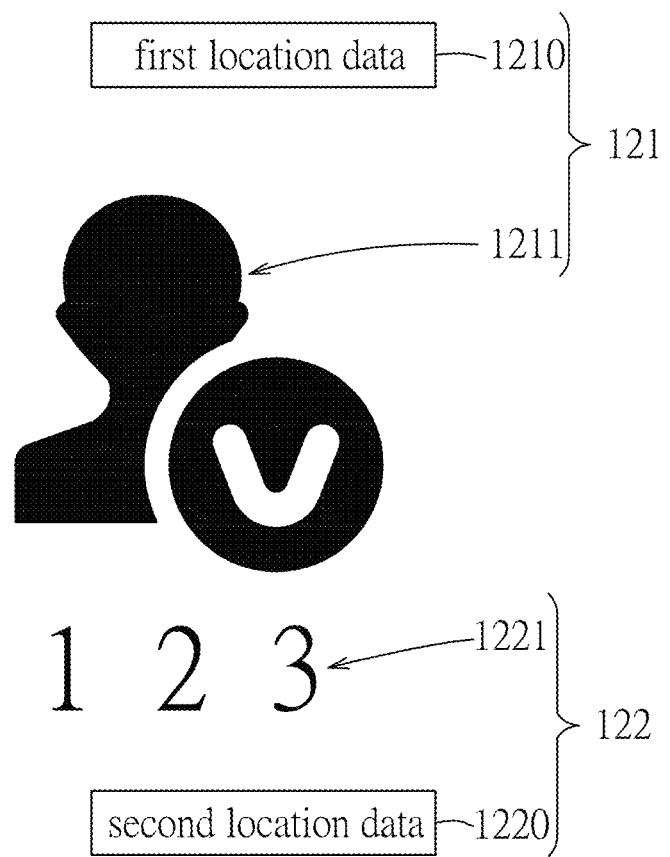
FIG. 12 schematically illustrates a plurality of verification data sets.
Figure 13:
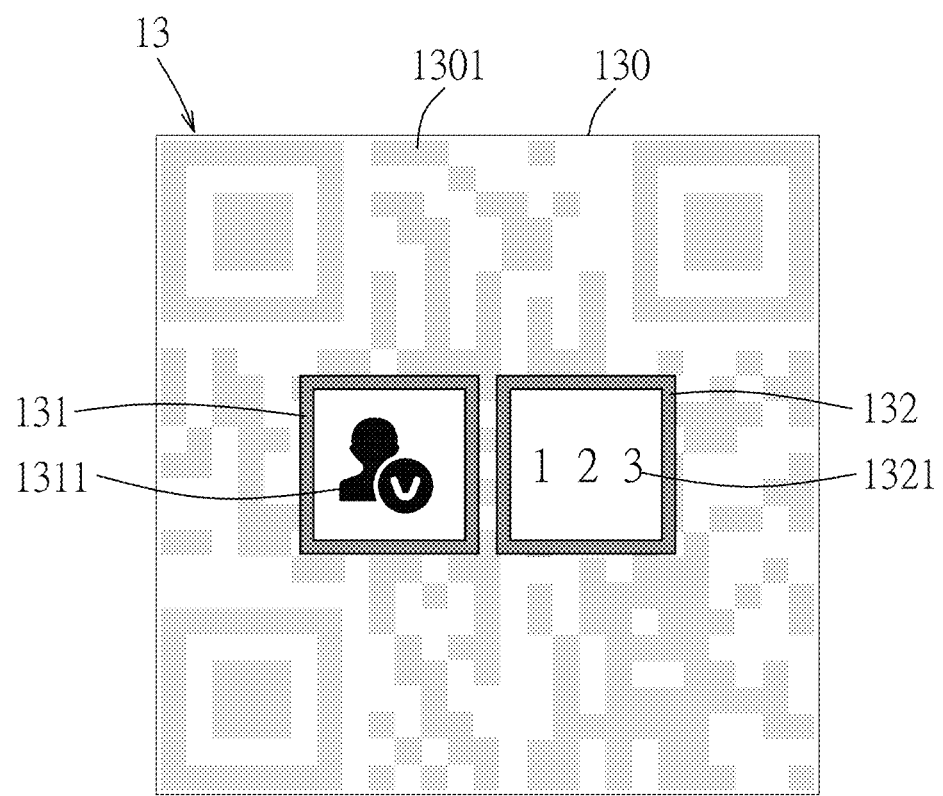
FIGS. 13 and 14 illustrate matrix barcodes that are generated according to some embodiments of the disclosure.

In other embodiments, the storage 101 of the barcode generating device 10 further stores a plurality of verification data sets. Taking FIG. 12 for illustration, the storage 101 stores a first verification data set 121 and a second verification data set 122. The first verification data set 121 includes first location data 1210 and first verification data 1211. The second verification data set 122 includes second location data 1220 and second verification data 1221. The first location data 1210 is different from the second location data 1220. In this embodiment, the first verification data 1211 is presented in the form of a picture, and the second verification data 1221 is presented in the form of numbers. In other embodiments, the first and second verification data may each be presented in the form of an audio signal or characters. The first processor 102, by encoding the target data set 40 and the first and second verification data sets 121, 122, generates a matrix barcode 13 having a data zone 130, a first verification zone 131 and a second verification zone 132 as shown in FIG. 13, and controls the first output unit 103 to display the matrix barcode 13. The data zone 130 presents a data barcode 1301. The locations of the first verification zone 131 and the second verification zone 132 in the matrix barcode 13 are determined based on the first location data 1210 and the second location data 1220, respectively. The first verification zone 131 presents first verification information 1311, which is generated based on the first verification data 1211. The second verification zone 132 presents second verification information 1321, which is generated based on the second verification data 1221. In this embodiment, the first verification information 1311 is presented in the form of a picture, and the second verification information 1321 is presented as a string of numbers "123".

In this case, after the image capturing unit 203 of the barcode verifying device 20 captures an image of the matrix barcode 13 (S81), the second processor 201 decodes the data barcode 1301 of the matrix barcode 13 to obtain the target data set 40 and the first and second verification data sets 121, 122 (S82). The second processor 201 further obtains the first verification information 1311 and the second verification information 1321 respectively from the first verification zone 131 and the second verification zone 132 according to the first location data 1210 of the first verification data set 121 and the second location data 1220 of the second verification data set 122, respectively (S82). The second processor 201 then determines whether the first verification information 1311 is related to the first verification data 1211 of the first verification data set 121 and whether the second verification information 1321 is related to the second verification data 1221 of the second verification data set 122 (S83). When both of the determinations are affirmative, the second processor 201 controls the second output unit 202 to display "verified" (S84); otherwise, i.e., when any one of the determinations is negative, the second processor 201 controls the second output unit 202 to display "verification failed" (S85).

Figure 14:
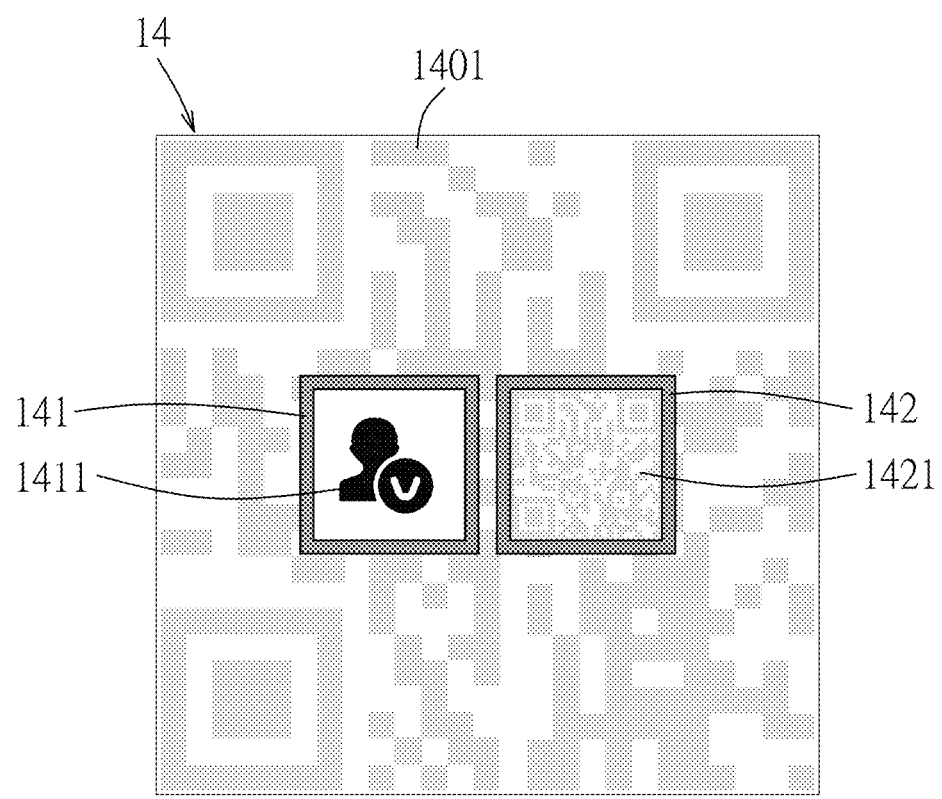

Furthermore, the verification information (i.e., the first verification information 1311 or the second verification information 1321) may be presented in the form of a barcode, and the barcode is generated based on the corresponding verification data (i.e., the first verification data 1211 or the second verification data 1221). For example, as shown in FIG. 14, a matrix barcode 14 that is generated according to an embodiment of this disclosure has a first verification zone 141 presenting first verification information 1411 that is in the form of a picture, and a second verification zone 142 presenting second verification information 1421 that is in the form of a barcode. Specifically, the first processor 102 generates the second verification information 1421 (in the form of the barcode, hereafter referred to as verification barcode) based on the second verification data 1221. That is to say, the verification barcode contains the second verification data 1221.

In this case, after the image capturing unit 203 of the barcode verifying device 20 captures an image of the matrix barcode 14 (S81), the second processor 201 decodes the data barcode 1401 of the matrix barcode 14 in the image to obtain the target data set 40 and the first and second verification data sets 121, 122. The second processor 201 further obtains the first verification information 1411 and the second verification information 1421 respectively from the first verification zone 141 and the second verification zone 142, according to the first location data 1210 of the first verification data set 121 and the second location data 1220 of the second verification data set 122, respectively. It is noted that, since the second verification information 1421 is presented in the form of a barcode, the second processor 201 is configured to decode the barcode of the second verification information 1421 to obtain the content of the second verification information 1421 (S82). The second processor 201 then determines whether the first verification information 1411 is related to the first verification data 1211 of the first verification data set 121, and whether the second verification information 1421 is related to the second verification data 1221 of the second verification data set 122 based on the decoded barcode (S83). When both of the determinations are affirmative, the second processor 201 controls the second output unit 202 to display "verified" (S84); otherwise, i.e., when any one of the determinations is negative, the second processor 201 controls the second output unit 202 to display "verification failed" (S85).

Figure 15:
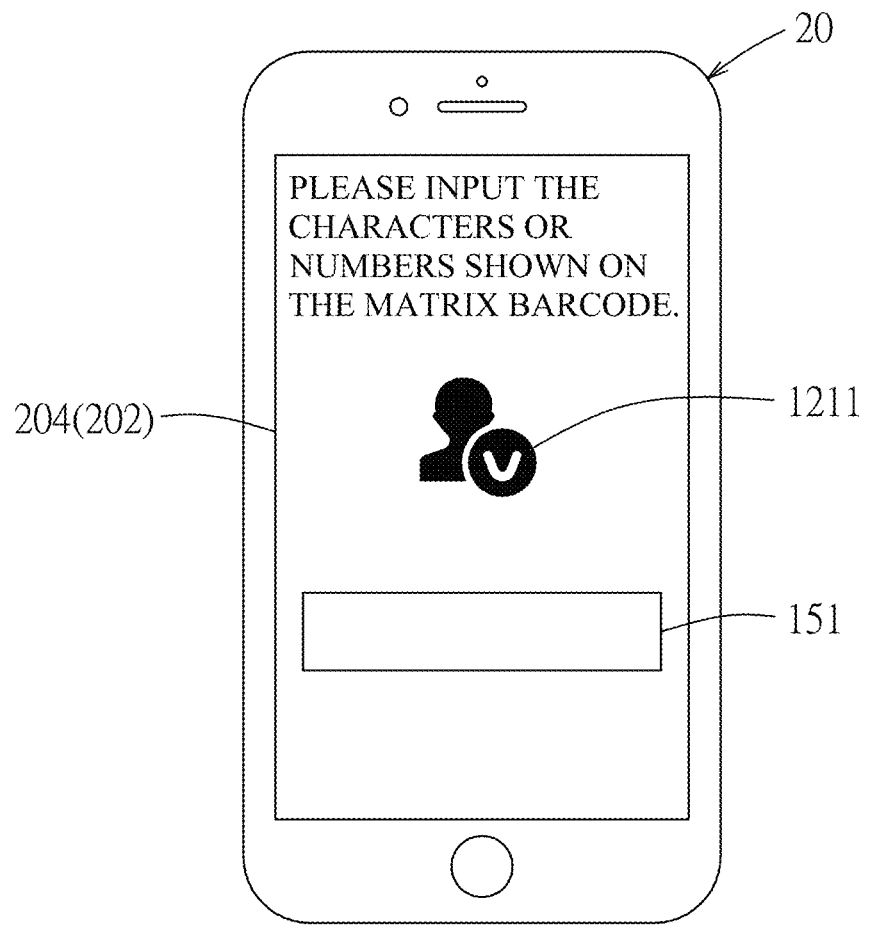
FIG. 15 illustrates a barcode verifying device displaying a field allowing a user to input verification information.

Referring to both FIGS. 7 and 15, in a similar embodiment, the input interface 204 of the barcode verifying device 20 is integrated with the second output unit 202 as a touchscreen. The second processor 201 may control the touchscreen to display a field 151 together with the first verification data 1211 of the first verification data set 121 that is obtained by decoding the data barcode 1301 of the matrix barcode 13, such that the user can determine whether the first verification information 1311 is related to the first verification data 1211 of the first verification data set 121. Rather than obtaining the second verification information 1321 from the second verification zone 132 (see FIG. 13), the second processor 201 receives a user input from the user via the field 151 on the touchscreen and makes the user input serve as the second verification information. That is to say, when the user sees the second verification information 1321 in the second verification zone 132, he/she has to type in the second verification information 1321 (e.g., a string of numbers "123"), and then the second processor 201 receives and processes the user input to determine whether the user input (the second verification information 1321) is related to the second verification data 1221 of the second verification data set 122.

In some embodiments that the storage 101 of the barcode generating device 10 stores a plurality of verification data sets, each of the verification data sets has a piece of verification data and an ordinal number. Taking FIG. 16 for illustration, the storage 101 stores four verification data sets 161, 162, 163 and 164. The verification data sets 161, 162, 163 and 164 include respective ordinal numbers of "4th, 3rd, 2nd, 1st" and respective pieces of verification data 1611, 1621, 1631 and 1641. For example, the four piece of verification data 1611, 1621, 1631 and 1641 may each be in the form of a number or a character; in the example depicted, the four piece of verification data 1611, 1621, 1631 and 1641 are "A, B, C, and D", respectively.

Figure 17:
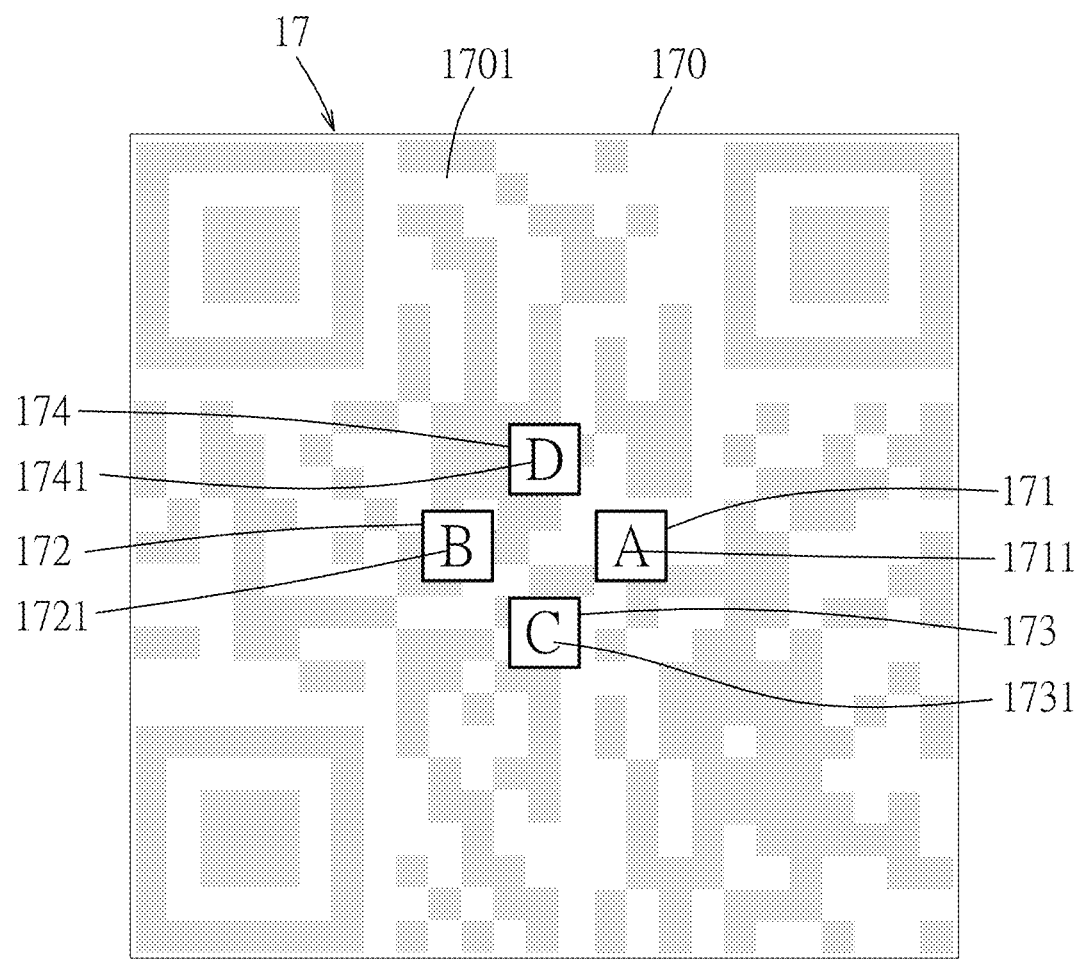
FIG. 17 illustrates a matrix barcode that is generated according to an embodiment of the disclosure.
Figure 18:
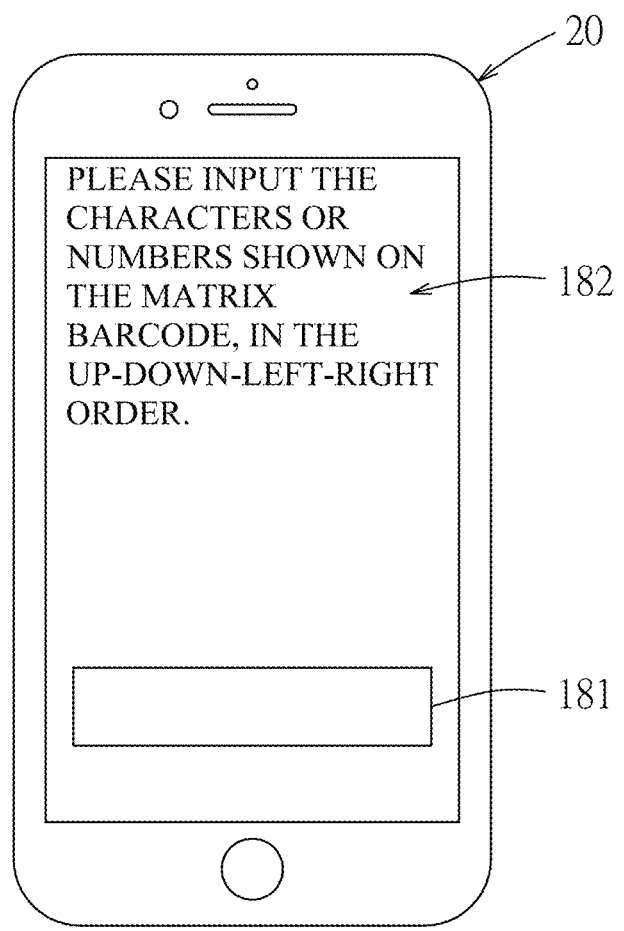
FIG. 18 illustrates a barcode verifying device displaying a field allowing a user to input verification information according to an embodiment of the disclosure.

By encoding the target data set 40 and the verification data sets 161, 162, 163 and 164, the first processor 102 generates a matrix barcode 17 having a data zone 170 and four verification zones 171, 172, 173 and 174 (see FIG. 17) that correspond to the verification data sets 161, 162, 163 and 164, respectively; the first processor 102 then controls the first output unit 103 to display the matrix barcode 17. The verification zones 171, 172, 173 and 174 are arranged in a specific order (e.g., an up-down-left-right order) according to the ordinal numbers of the corresponding verification data sets 161, 162, 163 and 164. Specifically, an upper one of the verification zones 174 corresponds to a highest priority, a bottom one of the verification zones 173 corresponds to the second highest priority, a left one of the verification zones 172 corresponds to the third highest priority, and a right one of the verification zones 171 corresponds to the lowest priority.

The data zone 170 presents a data barcode 1701. The verification zones 171, 172, 173 and 174 present four pieces of verification information 1711, 1721, 1731 and 1741, respectively, and the four pieces of verification information 1711, 1721, 1731 and 1741 are generated based on the four pieces of verification data 1611, 1621, 1631 and 1641, respectively. Accordingly, in this embodiment, the verification information 1741, "D", generated based on the verification data 1641 that corresponds to the ordinal number of "1st" is presented in the verification zone 174 that corresponds to the highest priority. Similarly, the verification information 1731, "C", the verification information 1721, "B", and the verification information 1711, "A", are presented in the verification zones 173, 172 and 171, respectively. In other embodiments, the verification zones 171-174 may be arranged in any specific order other than up-down-left-right order, such as in a clockwise direction or in a counterclockwise direction, etc. according to the ordinal numbers of the corresponding verification data sets 161, 162, 163 and 164, but this disclosure is not limited in this aspect.

After the image capturing unit 203 of the barcode verifying device 20 captures an image of the matrix barcode 17 (S81), the second processor 201 decodes the data barcode 1701 of the matrix barcode 17 in the image to obtain the target data set 40 and the verification data sets 161, 162, 163 and 164, and further to obtain the four pieces of verification data 1611, 1621, 1631 and 1641 and the corresponding ordinal numbers from the verification data sets 161-164 (S82).

In this embodiment, the second processor 201 controls the second output unit 202 to display a field 181 together with a notice 182 to instruct the user to input the four characters shown on the matrix barcode 17 into the field 181 in the up-down-left-right order. The order designated on the notice 182 (i.e., up-down-left-right) is in accordance with the order that the verification zones 171, 172, 173 and 174 are arranged. Then the second processor 201 receives the user input, via the field 181, of the four characters "DCBA" (i.e., the four pieces of verification information 1741, 1731, 1721 and 1711 that he/she sees in said order) and processes the user input to determine whether the user input are related respectively to the four pieces of verification data 1611, 1621, 1631 and 1641 of the verification data sets 161, 162, 163 and 164 (S83).

Specifically, the second processor 201 determines whether the first character to the last character of the user input, in said given order, are identical respectively to the four pieces of verification data 1641, 1631, 1621 and 1611, from the one corresponding to the ordinal number of "1st" down to the one corresponding to the ordinal number of "4th" in order. When the determination is affirmative, the second processor 201 controls the second output unit 202 to display "verified" (S84); otherwise, i.e., when any one of the characters is not identical to the corresponding piece of verification data, the second processor 201 controls the second output unit 202 to display "verification failed" (S85).

In view of the above, the barcode generating device 10 generates the matrix barcode that has at least one piece of verification information. In the case that the matrix barcode has been tampered with, the barcode verifying device 20 can detect the anomaly immediately, by comparing the verification information with the verification data set that is obtained by decoding the matrix barcode, without connecting to an external verification institution via the Internet.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A system for generating and verifying a matrix barcode, said system comprising:
   a barcode generating device including
      a storage configured to store a target data set and a verification data set,
      a first output unit, and
      a first processor electrically connected to said storage and said first output unit, and configured to generate the matrix barcode by encoding the target data set and the verification data set from said storage, and to control said first output unit to display the matrix barcode, the matrix barcode having a verification zone that presents a piece of verification information which is related to the verification data set; and
   a barcode verifying device including
      an image capturing unit configured to capture an image of the matrix barcode,
      a second processor electrically connected to said image capturing unit for receiving the image of the matrix barcode therefrom, and configured to
         decode the matrix barcode in the image to obtain the target data set and the verification data set,
         obtain the piece of verification information presented in the verification zone in the matrix barcode, and
         determine whether the piece of verification information presented in the verification zone is related to the verification data set obtained by decoding the matrix barcode in the image, and
      a second output unit electrically connected to and controlled by said second processor to output a result of verification of the matrix barcode;
   wherein said system is configured to operate in one of a first mode and a second mode, wherein, in the first mode,
      said storage is configured to store a plurality of first verification data sets, each having a piece of first verification data and a piece of location data,
      said first processor is configured to generate a first matrix barcode having a plurality of first verification zones presenting respective pieces of first verification information that are generated based respectively on the pieces of first verification data of the plurality of first verification data sets, and to determine, for each of the first verification zones, a location of the first verification zone in the first matrix barcode based on a corresponding one of the pieces of location data, and
      said second processor is configured to decode the first matrix barcode in the image to obtain the pieces of location data and the pieces of first verification data, to obtain the pieces of first verification information in the first verification zones according to the pieces of location data thus obtained, and to determine whether the pieces of first verification information obtained from the first verification zones are related to the respective pieces of first verification data obtained by decoding the first matrix barcode, wherein, in the second mode,
      said storage is configured to store a plurality of second verification data sets, and each of the second verification data sets has a piece of second verification data and an ordinal number,
      said first processor is configured to generate a second matrix barcode having a plurality of second verification zones, the second verification zones presenting respective pieces of second verification information that are generated based respectively on the pieces of second verification data of the second verification data sets, and being arranged in an order according to the ordinal numbers of the respective second verification data sets, and
      said second processor is configured to determine whether the pieces of second verification information are related respectively to the pieces of second verification data according to the ordinal numbers.

2. The system of claim 1, wherein said first processor of said barcode generating device is configured to encrypt the target data set and the verification data set according to an encryption algorithm with an encryption key so as to generate an encrypted data set, and to then generate the matrix barcode by encoding the encrypted data set in the matrix barcode.

3. The system of claim 1, wherein said first processor is configured to generate the matrix barcode to have the verification zone presenting the piece of verification information in a form of one of a picture, a character, a number, a barcode and a combination thereof, and the verification data set stored in said storage is in a form of one of a picture, an audio signal, a character, a number and a combination thereof.

4. The system of claim 1, wherein said first processor is configured to generate the piece of location data according to one of: a time right before said barcode generating device initiates a process for generating the matrix barcode; and a content of the verification data of the verification data set.

5. The system of claim 1, wherein said barcode verifying device further includes an input interface for receiving a user input that is inputted based on the piece of verification information presented in the verification zone of the matrix barcode; and
   wherein said second processor is further configured to process the user input for determining whether the user input is related to the verification data set.

6. A method for generating a matrix barcode, to be implemented by a barcode generating device that includes a storage, an output unit, and a processor electrically connected to the storage and the output unit, the method comprising steps of:
   storing, by the storage, a target data set and a verification data set;
   generating, by the processor, the matrix barcode by encoding the target data set and the verification data set, the matrix barcode having a verification zone that presents a piece of verification information which is related to the verification data set; and
   controlling, by the processor, the output unit to display the matrix barcode;
   wherein the method is implemented in one of a first mode and a second mode,
   wherein, in the first mode,
   the step of storing the target data set and the verification data set includes storing a plurality of first verification data sets each having a piece of first verification data and a piece of location data, and the step of generating the matrix barcode includes generating a first matrix barcode to have a plurality of first verification zones presenting respective pieces of first verification information that are generated based respectively on the pieces of first verification data of the plurality of first verification data sets, and determining, for each of the first verification zones, a location of the first verification zone in the first matrix barcode based on a corresponding one of the pieces of location data, wherein, in the second mode, the step of storing the target data set and the verification data set includes storing a plurality of second verification data sets, and each of the second verification data sets has a piece of second verification data and an ordinal number, and the step of generating the matrix barcode includes generating a second matrix barcode to have a plurality of second verification zones, the second verification zones presenting respective pieces of second verification information that are generated based respectively on the pieces of second verification data of the second verification data sets and being arranged in an order according to the ordinal numbers of the respective second verification data sets.

7. The method of claim 6, wherein the step of generating the matrix barcode includes:
encrypting the target data set and the verification data set according to an encryption algorithm with an encryption key so as to generate an encrypted data set; and
generating the matrix barcode by encoding the encrypted data set in the matrix barcode.

8. The method of claim 6, the verification data set in a form of one of a picture, an audio signal, a character, a number and a combination thereof,
wherein the step of generating the matrix barcode includes generating the piece of verification information in a form of one of a picture, a character, a number, a barcode and a combination thereof.

9. The method of claim 6, further comprising a step of:
generating, by the processor, the piece of location data according to one of time right before the method is initiated and content of the verification data of the verification data set.

10. A method for verifying a matrix barcode, to be implemented by a barcode verifying device that includes an image capturing unit, an output unit, and a processor electrically connected to the image capturing unit and the output unit, the matrix barcode being generated by encoding a target data set and a verification data set, the matrix barcode having a verification zone that presents a piece of verification information which is related to the verification data set, the method comprising steps of:
capturing, by the image capturing unit, an image of the matrix barcode;
decoding, by the processor, the matrix barcode in the image to obtain the target data set and the verification data set;
obtaining, by the processor, the piece of verification information presented in the verification zone in the image of the matrix barcode;
determining, by the processor, whether the piece of verification information presented in the verification zone is related to the verification data set obtained by decoding the matrix barcode; and controlling, by the processor, the output unit to output a result of verification of the matrix barcode;
wherein the method is implemented in one of a first mode for verifying a first matrix barcode and a second mode for verifying a second matrix barcode,
wherein, in the first mode,
the first matrix barcode is generated further based on a plurality of first verification data sets, each of the first verification data sets having a piece of first verification data and a piece of location data, the first matrix barcode having a plurality of first verification zones, the first verification zones presenting respective pieces of first verification information that are generated based respectively on the pieces of first verification data of the plurality of first verification data sets, a location of each of the first verification zones in the first matrix barcode being determined based on a corresponding one of the pieces of location data,
the step of decoding the matrix barcode includes decoding the first matrix barcode in the image to obtain the target data set, the pieces of location data and the pieces of first verification data
the step of obtaining the piece of verification information includes obtaining the pieces of first verification information in the first verification zones according to the pieces of location data thus obtained, and the step of determining whether the piece of verification information is related to the verification data set includes determining whether the pieces of first verification information obtained from the first verification zones are related to the respective pieces of first verification data obtained by decoding the first matrix barcode,
wherein, in the second mode,
the second matrix barcode is generate further based on a plurality of second verification data sets, each of the second verification data sets having a piece of second verification data and an ordinal number, the second matrix barcode having a plurality of second verification zones, the second verification zones presenting respective pieces of second verification information that are generated based respectively on the pieces of second verification data of the second verification data sets and being arranged in an order according to the ordinal numbers of the respective second verification data sets,
the step of decoding the matrix barcode includes decoding the second matrix barcode to obtain the target data set and the second verification data sets, and
the step of determining whether the piece of verification information is related to the verification data set includes determining whether the pieces of second verification information are related respectively to the pieces of second verification data according to the ordinal numbers.

11. The method of claim 10, the matrix barcode being generated by encrypting the target data set and the verification data set according to an encryption algorithm with an encryption key so as to generate an encrypted data set and by encoding the encrypted data set in the matrix barcode, wherein the step of decoding the matrix barcode includes:
decoding the matrix barcode to obtain the encrypted data set; and
decrypting the encrypted data set with a decryption key that corresponds to the encryption key so as to obtain the target data set and the verification data set.

12. The method of claim 10, wherein the step of decoding the matrix barcode includes decoding the matrix barcode to obtain the verification data set in a form of one of a picture, an audio signal, a character, a number and a combination thereof;

wherein the step of obtaining the piece of verification information includes obtaining the piece of verification information in a form of one of a picture, a character, a number, a barcode and a combination thereof.

13. The method of claim 10, the barcode verifying device further including an input interface for receiving a user input that is inputted based on the piece of verification information presented in the verification zone of the matrix barcode, wherein the step of determining whether the piece of verification information is related to the verification data set includes determining whether the user input is related to the verification data set.

14. The method of claim 13, the user input being in a form of an audio input, wherein the step of determining whether the piece of verification information is related to the verification data set includes processing the audio input to determine whether the audio input is related to the verification data set.

\* \* \* \* \*